United States Patent
Minoda et al.

(10) Patent No.: US 9,616,930 B2
(45) Date of Patent: Apr. 11, 2017

(54) SUSPENSION FRAME STRUCTURE

(71) Applicant: SUZUKI MOTOR CORPORATION, Hamamatsu (JP)

(72) Inventors: Yousei Minoda, Hamamatsu (JP); Takehiro Shoji, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 14/808,443

(22) Filed: Jul. 24, 2015

(65) Prior Publication Data

US 2016/0023680 A1   Jan. 28, 2016

(30) Foreign Application Priority Data

Jul. 28, 2014   (JP) ................................ 2014-152825

(51) Int. Cl.
   *B62D 21/11*   (2006.01)
(52) U.S. Cl.
   CPC .................... *B62D 21/11* (2013.01)
(58) Field of Classification Search
   CPC .................................................. B62D 21/11
   USPC ......................................................... 180/312
   See application file for complete search history.

(56) References Cited

U.S. PATENT DOCUMENTS

| 6,409,216 | B2 * | 6/2002 | Suzuki ................... 280/124.109 |
| 2006/0113784 | A1 * | 6/2006 | Kishima .............. B62D 21/155 280/784 |
| 2013/0175780 | A1 * | 7/2013 | Eickmann .......... B60G 21/0551 280/124.109 |
| 2013/0241186 | A1 * | 9/2013 | Shibaya ................ B62D 21/00 280/781 |
| 2015/0075896 | A1 * | 3/2015 | Imanishi ................ B62D 21/11 180/312 |
| 2016/0152272 | A1 * | 6/2016 | Tomikuda .............. B62D 21/02 296/203.01 |

FOREIGN PATENT DOCUMENTS

JP   2012192838   10/2012

* cited by examiner

*Primary Examiner* — James A English
(74) *Attorney, Agent, or Firm* — Silicon Valley Patent Group LLP

(57) ABSTRACT

A suspension frame structure with which a high rigidity can be obtained with respect to load applied from suspension arms and an engine mount is provided. In a suspension frame structure according to the present invention, a suspension frame includes a right front fixing portion, a left front fixing portion, a right rear fixing portion and a left rear fixing portion to which a right suspension arm and a left suspension arm are fixed, contours of the right extension bracket and the left extension bracket on an interior side of a vehicle extend along an circular arc-shaped locus that connects side member fixing positions and an engine mount attachment portion, as viewed from an upper side of a vehicle, and tangents at front ends of the contours respectively pass through arm fixing positions.

12 Claims, 5 Drawing Sheets

SUSPENSION FRAME STRUCTURE

CROSS-REFERENCE TO RELATED APPLICATION

This application is based upon and claims the benefit of priority from the prior Japanese Patent Application No. 2014-152825, filed on Jul. 28, 2014, the entire contents of which are incorporated herein by reference.

FIELD

The present invention relates to a suspension frame structure including a suspension frame that extends in a vehicle width direction in a lower part of a vehicle, suspension arms being fixed to the outer sides of the suspension frame in the vehicle width direction, and an engine mount being attached to the center of the suspension frame in the vehicle width direction, and extension brackets that connect the suspension frame to vehicle body structural members.

BACKGROUND

In general, a suspension frame attached to a vehicle spans a pair of left and right side members extending in the front-rear direction. Suspension arms (which are referred to also as "lower arms") that suspend wheels are attached to the outer sides, with respect to the vehicle width direction, of the suspension frame (e.g., Japanese Patent Laid-open Publication No. JP 2012-192838A).

Loads generated due to vibrations during driving are applied to the suspension arms. Therefore, high rigidity is required, in particular, at the suspension arm fixing positions in the suspension frame in order to ensure favorable NVH (noise, vibration, harshness). Accordingly, in Japanese Patent Laid-open Publication No. JP 2012-192838A, left and right body attachment members that are respectively attached to the left and right sides of the main body of the member (suspension frame) on the front side support front supporting portions of the left and right lower arms with the axis direction extending in the front-rear direction. According to Japanese Patent Laid-open Publication No. JP 2012-192838A, with such a configuration, it is easy to ensure the accuracy of attachment positions and the rigidity, and it is possible to improve productivity.

It is thought that with the technology in Japanese Patent Laid-open Publication No. JP 2012-192838A, it is possible to improve the rigidity with respect to load (moment) in the front-rear direction applied to the suspension arms during braking of a vehicle. However, not only the load in the front-rear direction but also load in the left-right direction during cornering is applied to the positions to which the suspension arms are fixed. At this time, if a nut is configured to receive a bolt on one side of the body attachment member as described in Japanese Patent Laid-open Publication No. JP 2012-192838A, only a bearing surface of the nut receives the load in the left-right direction. Therefore, there is a concern that the load input from the suspension arms cannot be efficiently received, resulting in the deterioration of the performance of the suspension. Accordingly, with the technology in Japanese Patent Laid-open Publication No. JP 2012-192838A, it is difficult to obtain sufficient rigidity with respect to the load input from the suspension arms, and there is room for further improvement.

Moreover, in the case where an engine mount (which is referred to also as a torque rod) for suspending an engine is attached to a suspension frame, not only load from suspension arms but also loads from the engine via the engine mount are applied to the suspension frame. Specifically, in an engine, fluctuations in the rotational force (torque) in the frontward and rearward directions are generated due to changes of the number of revolutions during acceleration and deceleration. Therefore, when the engine and the suspension frame are coupled to each other using the engine mount, load swinging in the front-rear direction is applied to the suspension frame from the engine mount. Accordingly, the rigidity with respect to loads from the engine mount in addition to loads from the suspension arms has been required in the suspension frame.

In view of the foregoing problems, it is an object of the present invention to provide a suspension frame structure with which a high rigidity can be obtained with respect to loads applied from suspension arms and an engine mount.

SUMMARY OF THE DISCLOSURE

In order to solve the foregoing problems, a suspension frame structure according to the present invention having a typical configuration is a suspension frame structure including a suspension frame extending in a vehicle width direction in a lower part of a vehicle, suspension arms being fixed to the outer sides of the suspension frame in the vehicle width direction, and an engine mount being attached to the center of the suspension frame in the vehicle width direction, and extension brackets for connecting the suspension frame to vehicle body structural members, wherein the suspension frame includes a central portion that is located at the center in the vehicle width direction and to which the engine mount is attached, a right front fixing portion and a left front fixing portion that extend toward outer sides from front portions of both ends of the central portion in the vehicle width direction and to which the suspension arms are fixed, and a right rear fixing portion and a left rear fixing portion that extend toward outer sides from rear portions of both ends of the central portion in the vehicle width direction and to which the suspension arms are fixed, the extension brackets are respectively attached to rear edges of the right rear fixing portion and the left rear fixing portion, extend toward a vehicle rear side, and are fixed to the vehicle body structural members, contours of the extension brackets on an interior side of a vehicle extend along a circular arc-shaped locus that connects positions of the vehicle body structural members to which the extension bracket is fixed and a position of the central portion to which the engine mount is attached, as viewed from an upper side of a vehicle, and tangents at front ends of the contours, extending along the circular arc-shaped locus, of the left and right extension brackets respectively pass through positions of the right front fixing portion and the left front fixing portion to which the suspension arms are fixed.

With the above configuration, the load in the front-rear direction during braking and the load in the left-right direction during cornering that are applied to the right front fixing portion and the left front fixing portion can be efficiently distributed to the extension brackets located on the opposite sides with respect thereto in the left-right direction using the tangents at the front ends of the contours as paths. This makes it possible to prevent stress concentration at the positions on the front side to which the suspension arms are fixed, and thus to obtain a suspension frame with a high rigidity.

Moreover, in the case where the tangents at the front ends of the contours pass through the positions to which the suspension arms are fixed in the right front fixing portion and the left front fixing portion as in the above configuration, the tangents are located near the front edge of the suspension frame. This makes it possible to reduce the moment of the load applied from the suspension arms, and to reduce the amount of deformation in the twisting direction.

It is preferable that the tangents of the left and right extension brackets intersect near the position of the central portion to which the engine mount is attached. With this configuration, it is possible to preferably distribute the load input from the engine mount to the entire vehicle body via the extension brackets. Accordingly, the rigidity of the suspension frame can be further improved.

It is preferable that a straight line that connects the front ends of the contours, extending along the circular arc-shaped locus, of the left and right extension brackets passes through positions of the right rear fixing portion and the left rear fixing portion to which the suspension arms are fixed, as viewed from an upper side of a vehicle. This makes it possible to efficiently distribute the load applied to the right rear fixing portion and the left rear fixing portion from the suspension arms to the extension brackets during cornering.

It is preferable that the suspension frame includes an upper surface to which the engine mount is attached, a vertical surface that extends downward from an edge of the upper surface on a vehicle rear side, and a lower surface that extends toward a vehicle front side from a lower edge of the vertical surface, the extension brackets each include a lower wall that is continuous with the lower surface and extends toward the vehicle rear side, an outer vertical wall that extends upward from a side edge of the lower wall on an outer side in the vehicle width direction, and an inner vertical wall that extends upward from a side edge of the lower wall on an inner side in the vehicle width direction, and an upper edge of the inner vertical wall is continuous with an edge of the upper surface on the vehicle rear side.

With this configuration, the extension brackets have a U-shape that is open upward in the longitudinal cross section in the vehicle width direction. This makes it possible to improve the rigidity of the extension brackets, and in turn, to obtain a higher load distribution performance. Moreover, since the upper edge of the inner vertical wall and the edge of the upper surface of the suspension frame on the vehicle rear side, that is, the contours of these edges are continuous with each other, the load is more efficiently distributed from the suspension frame to the extension brackets. Furthermore, since the extension brackets are joined to the suspension frames with the lower wall, the outer vertical wall and the inner vertical wall, it is possible to improve their joining strength, and to reduce the deformation of the suspension frame in the twisting direction.

It is preferable that the outer vertical wall extends toward a vehicle front side until the outer vertical wall overlaps a space surrounded by the upper surface, the vertical surface and the lower surface of the suspension frame as viewed from a side of a vehicle. A portion of the space surrounded by the upper surface, the vertical surface and the lower surface of the suspension frame, that is, a portion of an opening is covered with the outer vertical wall. Accordingly, it is possible to suppress the deformation of the opening, and in turn, to reduce the amount of the deformation of the suspension frame in the twisting direction, thus preventing the deterioration of the performance of the suspension. Moreover, since the outer vertical wall is joined to the upper surface, the vertical surface and the lower surface of the suspension frame, it is possible to improve their joining strength.

With the present invention, it is possible to provide a suspension frame structure with which a high rigidity can be obtained with respect to loads applied from suspension arms and an engine mount.

DETAILED DESCRIPTION

Figure 1:
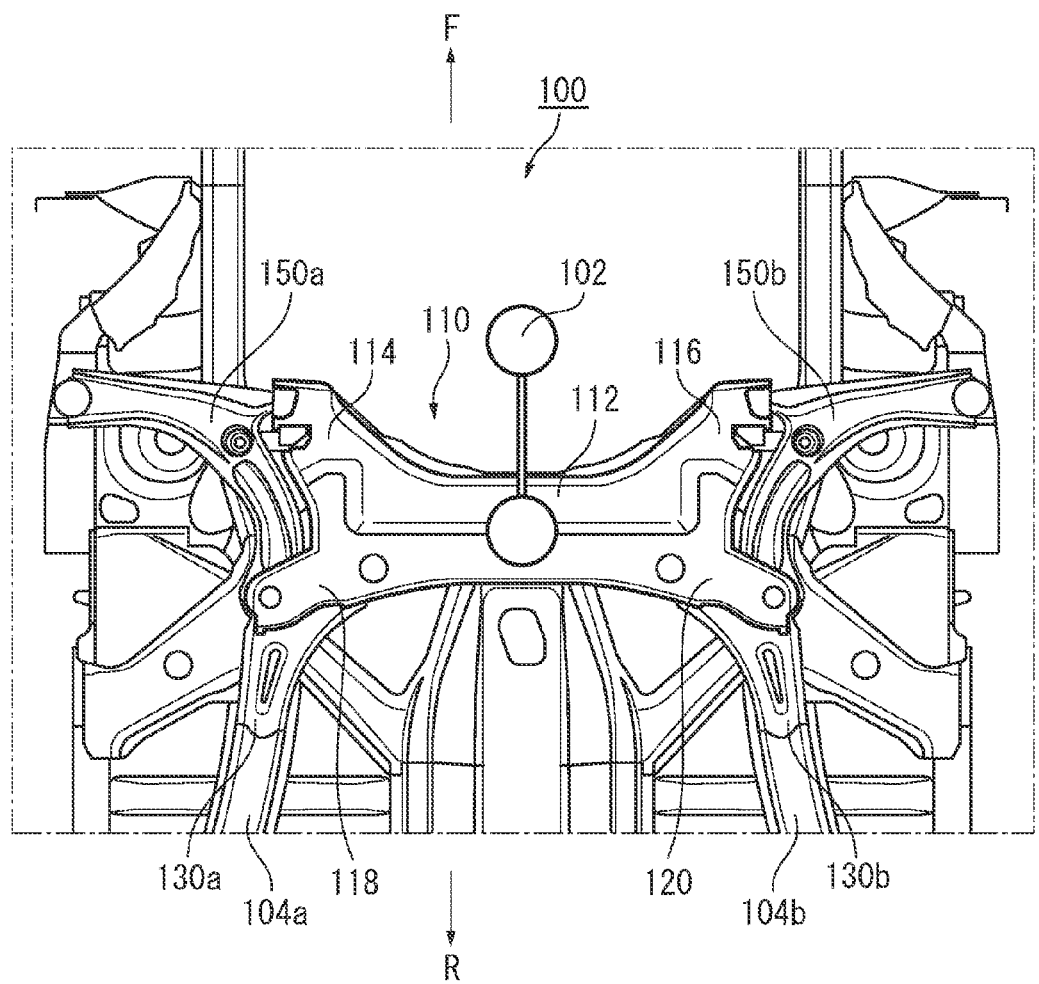
FIG. 1 is a diagram showing an example of a suspension frame structure according to one embodiment.

Hereinafter, a preferred embodiment of the present invention will be described in detail with reference to the accompanying drawings. The dimensions, materials, and other specific numerical values described in this embodiment are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

Figure 2:
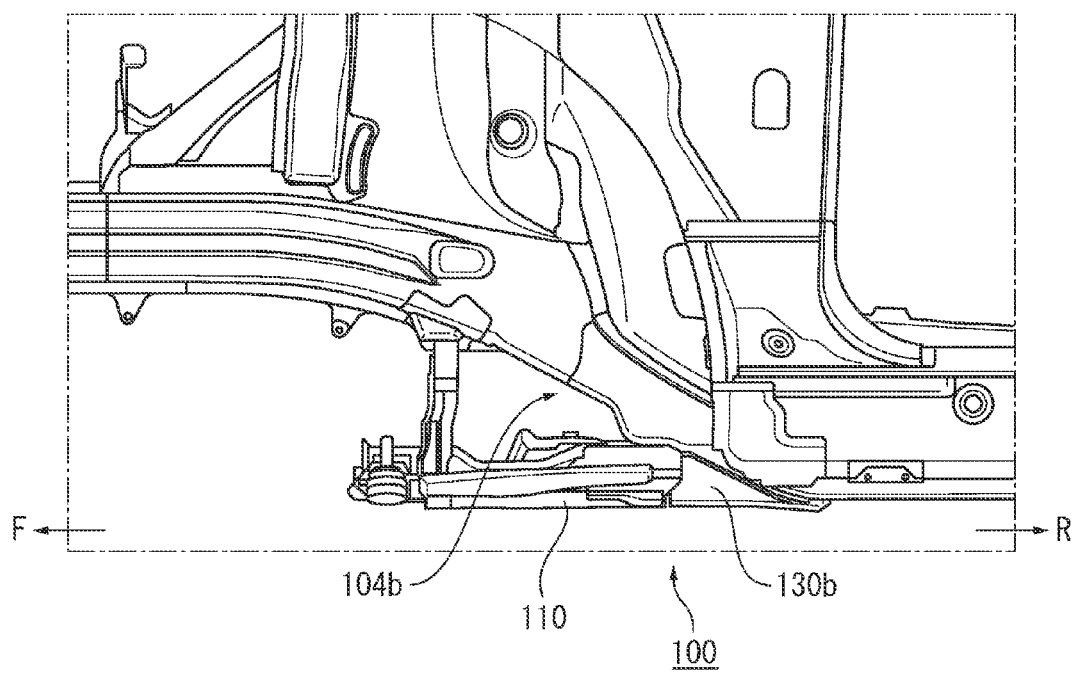
FIG. 2 is a diagram of the suspension frame structure shown in FIG. 1 as viewed from a left side.
Figure 3:
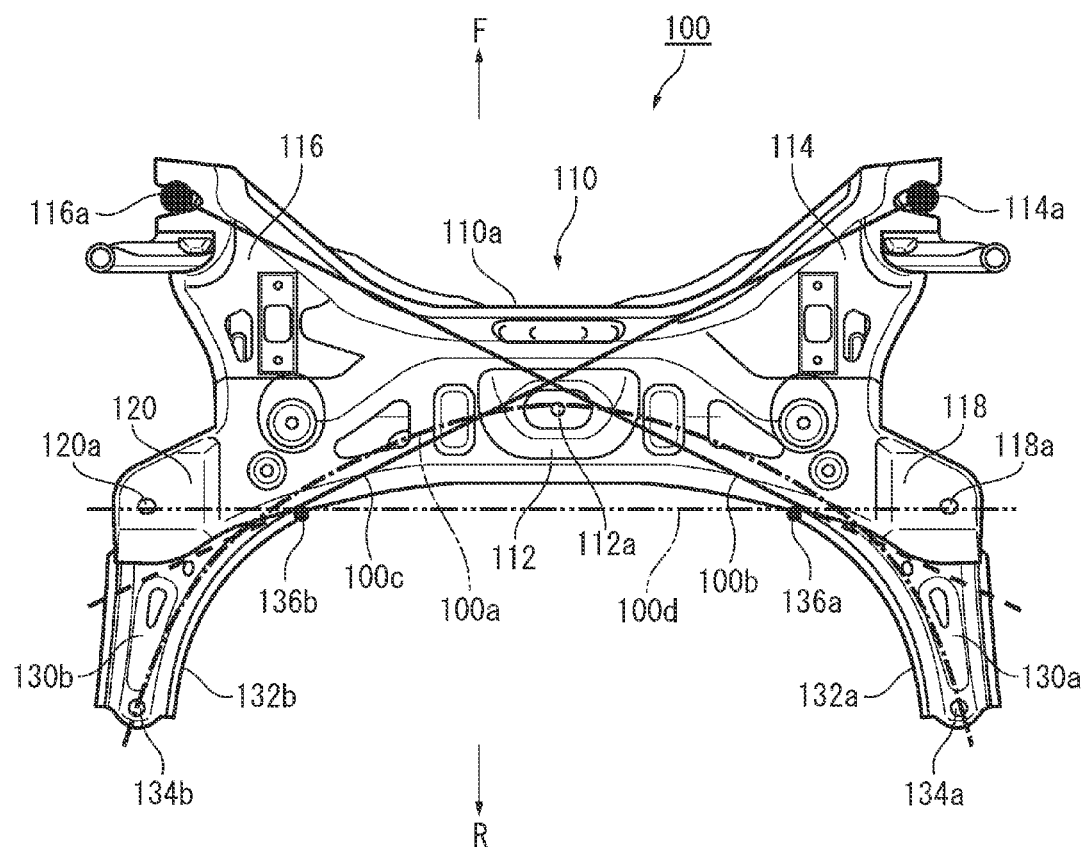
FIG. 3 is a diagram of the suspension frame structure shown in FIG. 1 as viewed from above.

FIG. 1 is a diagram showing an example of a suspension frame structure 100 according to this embodiment, and is a diagram of the suspension frame structure 100 as viewed from below. FIG. 2 is a diagram of the suspension frame structure 100 shown in FIG. 1 as viewed from a left side. FIG. 3 is a diagram of the suspension frame structure 100 shown in FIG. 1 as viewed from above. It should be noted that an engine mount 102 is schematically shown in FIG. 1 in order to facilitate the understanding. Moreover, although FIG. 2 shows the configuration of a vehicle on the left side as an example, the vehicle has the same configuration on the opposite side.

As shown in FIGS. 1 and 3, the suspension frame structure 100 according to this embodiment is configured to include a suspension frame 110, and a right extension bracket 130a and a left extension bracket 130b that are respectively disposed on the right and left sides thereof. The suspension frame 110 extends in a vehicle width direction in a lower part of a vehicle, and right suspension arm 150a and a left suspension arm 150b that are respectively disposed on the right and left sides are fixed to the outer sides of the suspension frame 110 in the vehicle width direction. Moreover, in this embodiment, the engine mount 102 is attached to the center of the suspension frame 110 in the vehicle width direction.

The right extension bracket 130a and the left extension bracket 130b connect the suspension frame 110 to a right side member 104a (i.e. a side member disposed on the right) and a left side member 104b (i.e. a side member disposed on the left) that are vehicle body structural members. Hereinafter, when collectively indicating the right extension bracket 130a and the left extension bracket 130b, they are referred to simply as "extension brackets". Similarly, in terms of the right side member 104a and left side member 104b, and the right suspension arm 150a and the left suspension arm 150b, when collectively indicating the left and right members, they are referred to simply as "side members" and "suspension arms", respectively.

As shown in FIG. 3, the suspension frame 110 is configured to include a central portion 112, a right front fixing portion 114 and a left front fixing portion 116, and a right rear fixing portion 118 and a left rear fixing portion 120. The central portion 112 is located at the center in the vehicle width direction, and an engine mount attachment portion 112a, which is a position to which the engine mount 102 (see FIG. 1) is attached, is provided at the center of the central portion 112 in the vehicle width direction.

The right front fixing portion 114 and the left front fixing portion 116 extend outward from the front portions of both ends of the central portion 112 in the vehicle width direction, and the right suspension arm 150a and the left suspension arm 150b (see FIG. 1) are respectively fixed to the outer end portions of the right front fixing portion 114 and the left front fixing portion 116 in the vehicle width direction. The right rear fixing portion 118 and the left rear fixing portion 120 extend outward from the rear portions of both ends of the central portion 112 in the vehicle width direction, and the right suspension arm 150a and the left suspension arm 150b are respectively fixed to the outer end portions of the right rear fixing portion 118 and the left rear fixing portion 120 in the vehicle width direction.

That is, the suspension frame 110 of this embodiment is substantially H-shaped in which the positions to which the left and right suspension arms are fixed are located on the front side with respect to the front end of the central portion 112 and on the rear side with respect to the rear end of the central portion 112. Hereinafter, the end portions of the right front fixing portion 114 and left front fixing portion 116, and the right rear fixing portion 118 and left rear fixing portion 120, to which the suspension arms are fixed, are respectively referred to as arm fixing positions 114a, 116a, 118a and 120a for the sake of convenience in the description.

As shown in FIGS. 1 and 3, the right extension bracket 130a and the left extension bracket 130b are respectively attached to the rear edges of the right rear fixing portion 118 and the left rear fixing portion 120. Moreover, as shown in FIG. 2, the extension brackets extend toward the vehicle rear side, and are fixed to the side members (the left extension bracket 130b and the left side member 104b are shown as examples in FIG. 2), which are vehicle body structural members.

In this embodiment, as shown in FIG. 3, the positions of the side members (vehicle body structural members, see FIG. 1) to which the extension brackets are fixed (referred to as side member fixing positions 134a and 134b hereinafter) and the engine mount attachment portion 112a of the central portion 112 lie on a circular arc-shaped locus 100a as viewed from the vehicle upper side. In other words, the engine mount attachment portion 112a and the side member fixing positions 134a and 134b are located on the circular arc-shaped locus 100a. A contour 132a of the right extension bracket 130a on the vehicle interior side and a contour 132b of the left extension bracket 130b on the vehicle interior side extend along the circular arc-shaped locus 100a, which connects the side member fixing positions 134a and 134b and the engine mount attachment portion 112a, as viewed from the vehicle upper side.

This embodiment is characterized in that tangents 100b and 100c at front ends 136a and 136b of the contours 132a and 132b of the right extension bracket 130a and left extension bracket 130b respectively pass through the arm fixing positions 114a and 116a, which are the positions of the right front fixing portion 114 and the left front fixing portion 116 to which the suspension arms are fixed. This makes it possible to efficiently distribute the load in the front-rear direction during braking and the load in the left-right direction during cornering that are applied to the right front fixing portion 114 and the left front fixing portion 116 to the extension brackets located on the opposite sides with respect thereto in the left-right direction using the tangents 100b and 100c at the front ends 136a and 136b of the contours 132a and 132b as paths. Accordingly, it is possible to prevent stress concentration at the arm fixing positions 114a and 116a, which are the positions on the front side to which the suspension arms are fixed, and thus to improve the rigidity of the suspension frame 110.

When the tangents 100b and 100c at the front ends 136a and 136b of the contours 132a and 132b pass through the arm fixing positions 114a and 116a as in this embodiment, the tangents 100b and 100c are disposed near a front edge 110a of the suspension frame as shown in FIG. 3. Even if force to twist the suspension frame 110 is applied to the proximity of the front edge 110a of the suspension frame, for example, from the suspension arms via the arm fixing positions 114a and 116a, the twisting force is applied to the close proximity to the tangents 100b and 100c because the tangents 100b and 100c pass through the arm fixing positions 114a and 116a. Accordingly, a moment around the tangents 100b and 100c as the centers can be reduced, thus making it possible to prevent the stress concentration in the suspension frame, and in turn, to reduce the amount of deformation in the twisting direction.

Furthermore, in this embodiment, as shown in FIG. 3, the tangents 100b and 100c of the right extension bracket 130a and the left extension bracket 130b intersect near the engine mount attachment portion 112a, which is the position of the central portion 112 to which the engine mount 102 is attached. The load input from the engine mount 102 (see FIG. 1) is thereby transmitted to the extension brackets using the tangents 100b and 100c as paths, and is efficiently distributed to the entire vehicle body via the extension brackets. Accordingly, it is possible to further improve the rigidity of the suspension frame 110.

Moreover, in this embodiment, as shown in FIG. 3, a straight line 100d that joins the front ends 136a and 136b of the contours 132a and 132b of the right extension bracket 130a and left extension bracket 130b passes through the suspension arm fixing positions 118a and 120a of the right rear fixing portion 118 and the left rear fixing portion 120, as viewed from the vehicle upper side. This makes it possible to efficiently distribute the load applied to the right rear fixing portion 118 and the left rear fixing portion 120 from the suspension arms during cornering to the extension brackets, and to further improve the rigidity of the suspension frame 110.

Figure 4:
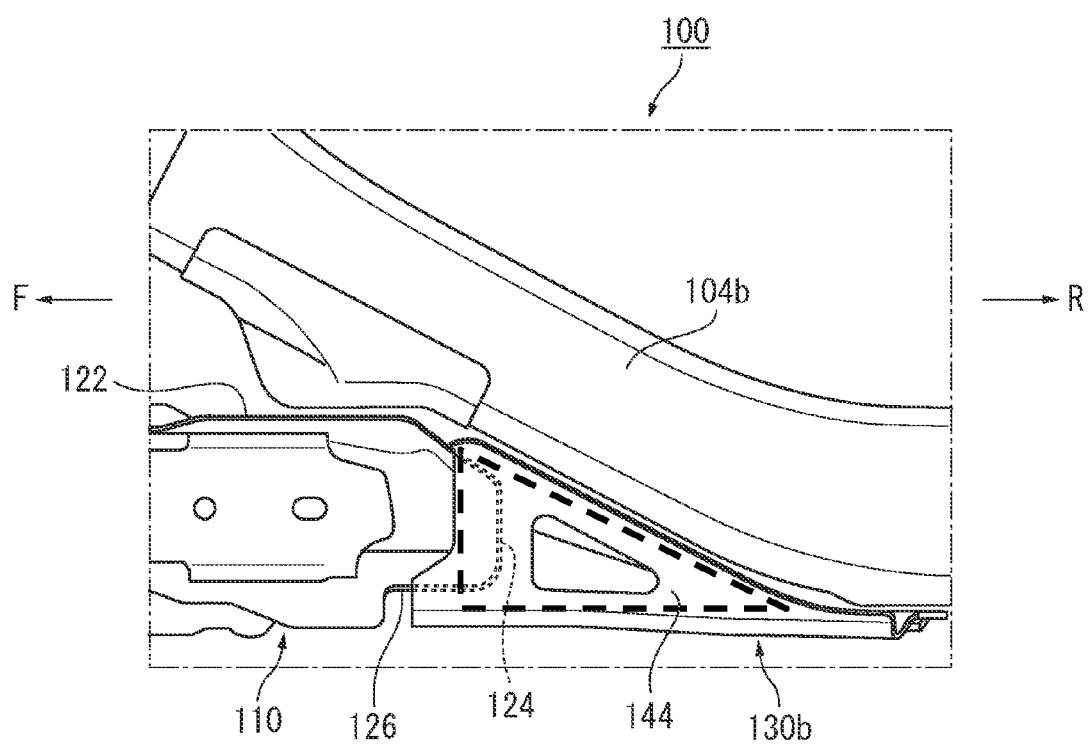
FIG. 4 is an enlarged view of an area near a left extension bracket in FIG. 2.
Figure 5A:
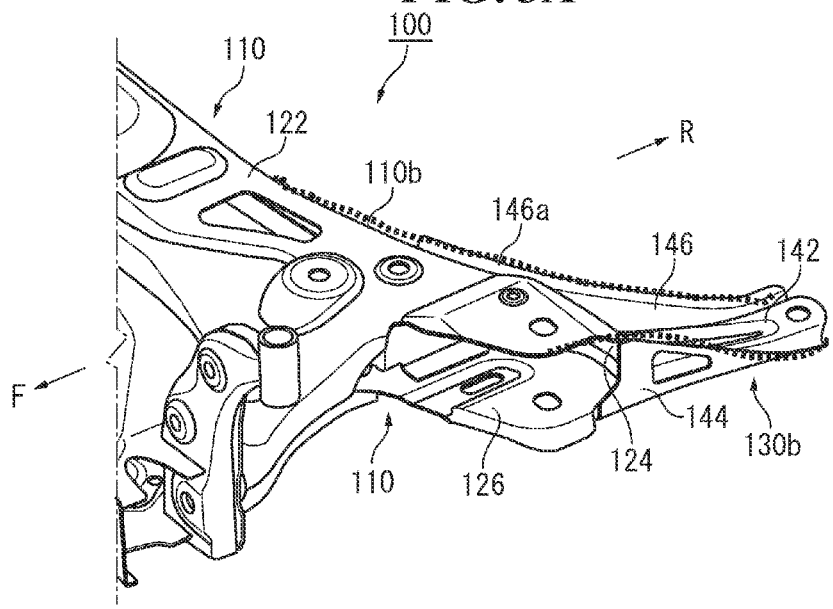
FIGS. 5A and 5B show diagrams of the area near the left extension bracket shown in FIG. 4 as viewed from different directions.
Figure 5B:
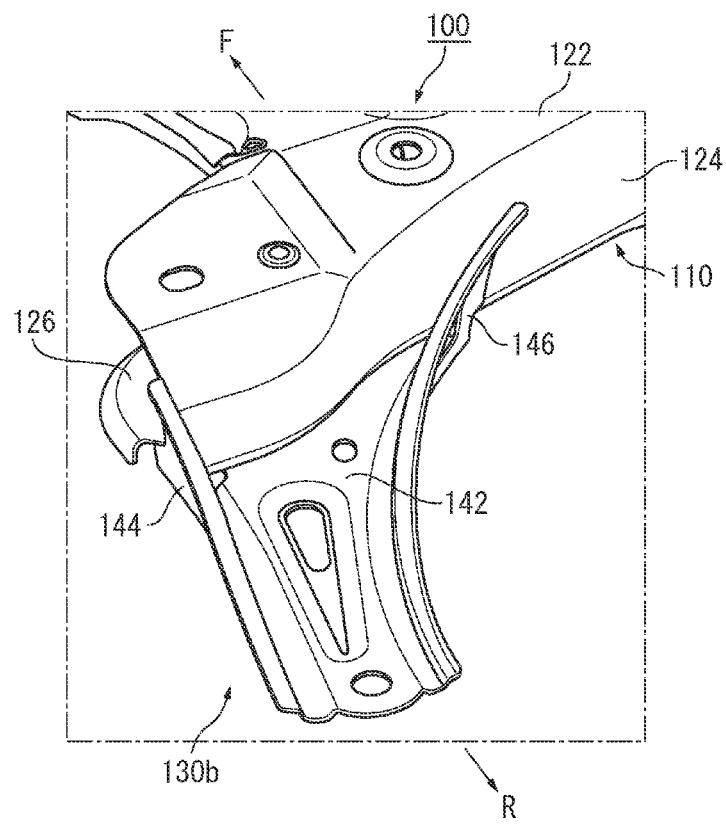

FIG. 4 is an enlarged view of an area near the left extension bracket 130b in FIG. 2. FIGS. 5A and 5B show diagrams of the area near the left extension bracket shown in FIG. 4 as viewed from different directions. FIG. 5A is a diagram illustrating a state in which the area near the left extension bracket 130b shown in FIG. 4 is viewed from the left upper front side, and FIG. 5B is a diagram illustrating a state in which the area near the left extension bracket shown in FIG. 4 is viewed from the left upper rear side. It should be noted that the left side member 104b shown in FIG. 4 is not shown in FIGS. 5A and 5B, and a portion of the cross section of the suspension frame 110 is shown by a broken line in FIG. 4, for the sake of convenience in the description.

As shown in FIGS. 5A and 5B, the suspension frame 110 of this embodiment has an upper surface 122 to which the engine mount 102 (see FIG. 1) is attached, and a vertical surface 124 extends downward from the edge of the upper surface 122 on the vehicle rear side. In the suspension frame 110, a lower surface 126 extends toward the vehicle front side from the lower edge of the vertical surface 124. Thereby, as shown in FIG. 4, the longitudinal cross section of the suspension frame 110 in the vehicle front-rear direction has a U-shape that is open toward the vehicle front side.

On the other hand, as shown in FIG. 5B, the extension bracket (left extension bracket 130b in FIG. 5B) has a lower wall 142 that is continuous with the lower surface 126 of the suspension frame 110 and extends toward the vehicle rear side. In addition, in the left extension bracket 130b, an outer vertical wall 144 extends upward from the side edge of the lower wall 142 on the outer side in the vehicle width direction, and an inner vertical wall 146 extends upward from the side edge of the lower wall 142 on the inner side in the vehicle width direction.

With the above configuration, the longitudinal cross section of the left extension bracket 130b of this embodiment in the vehicle width direction has a U-shape that is open upward, as shown in FIG. 5B. This makes it possible to further improve the rigidity of the extension bracket and in turn, the load distribution performance thereof. Moreover, since the left extension bracket 130b can be joined to the suspension frame 110 with the three walls, that is, the lower wall 142, the outer vertical wall 144 and the inner vertical wall 146, it is possible to improve the joining strength between the left extension bracket 130b and the suspension frame 110, and to suppress the deformation of the suspension frame 110 in the twisting direction.

Furthermore, in this embodiment, as shown by broken lines in FIG. 5A, an upper edge 146a of the inner vertical wall 146 of the left extension bracket 130b is continuous with an edge 110b of the upper surface 122 of the suspension frame 110 on the vehicle rear side. This makes it possible to more efficiently distribute (transmit), to the extension brackets, the load applied to the suspension frame 110 from the suspension arms.

Moreover, in this embodiment, as shown in FIG. 4, the upper surface 122 and the lower surface 126 of the suspension frame 110 are connected to positions near the front end of the outer vertical wall 144 of the left extension bracket 130b, and the outer vertical wall 144 is inclined downward as it extends toward the vehicle rear side along the shape of the side member (the left side member 104b is shown as an example in FIG. 4) fixed above the outer vertical wall 144. That is, in this embodiment, the left extension bracket 130b has a substantially triangular shape as shown by broken lines below the left side member 104b.

With the above configuration, in the event of a front-end collision, the suspension frame 110 easily moves so as to enter under the side members. Accordingly, it is possible to evacuate the suspension frame 110 under the side members in the event of a front-end collision, and to further suppress the deformation of the suspension frame 110.

Furthermore, in this embodiment, as shown in FIG. 4, the outer vertical wall 144 of the left extension bracket 130b extends toward the vehicle front side until the outer vertical wall 144 overlaps the space surrounded by the upper surface 122, the vertical surface 124 and the lower surface 126 of the suspension frame 110 as viewed from the side of the vehicle. Thereby, a portion of the space in the opening of the suspension frame 110, that is, a portion on the rear side is covered by the outer vertical wall 144, thus suppressing the deformation of the opening. Accordingly, it is possible to reduce the amount of the deformation of the suspension frame 110 in the twisting direction, and to suppress the deterioration of the performance of the suspension. Moreover, since the outer vertical wall 144 is joined to the upper surface 122, the vertical surface 124 and the lower surface 126 of the suspension frame 110, it is possible to further improve the joining strength between the extension brackets and the suspension frame.

While a preferred embodiment of the present invention has been described above with reference to the accompanying drawings, it should be appreciated that the present invention is not limited to the embodiment shown above. It will be apparent for a person skilled in the art that various modifications and variations may be made within the scope of the invention as defined in the appended claims, and those modifications and variations should be understood to be included within the technical scope of the present invention.

The present invention can be used in a suspension frame structure including a suspension frame that extends in a vehicle width direction in a lower part of a vehicle, suspension arms being fixed to the outer sides of the suspension frame in the vehicle width direction, and an engine mount being attached to the center of the suspension frame in the vehicle width direction, and an extension bracket that connects the suspension frame to a vehicle body structural member.

The invention claimed is:
1. A suspension frame structure comprising:
a suspension frame extending in a vehicle width direction in a lower part of a vehicle, suspension arms being fixed to outer sides of the suspension frame in the vehicle width direction, and an engine mount being attached to a center of the suspension frame in the vehicle width direction, and
first extension brackets for connecting the suspension frame to vehicle body structural members,
wherein the suspension frame includes:
a central portion that is located at the center in the vehicle width direction and to which the engine mount is attached;
a right front fixing portion and a left front fixing portion that extend toward outer sides from front portions of both ends of the central portion in the vehicle width direction and to which the suspension arms are fixed; and
a right rear fixing portion and a left rear fixing portion that extend toward outer sides from rear portions of both ends of the central portion in the vehicle width direction and to which the suspension arms are fixed,
wherein the first extension brackets are respectively attached to rear edges of the right rear fixing portion and the left rear fixing portion, extend toward a vehicle rear side, and are fixed to the vehicle body structural members,
wherein contours of the first extension brackets on an interior side of the vehicle extend along a circular arc-shaped locus that connects positions of the vehicle body structural members to which the first extension brackets are fixed and a position of the central portion to which the engine mount is attached, as viewed from an upper side of the vehicle, and
wherein tangents at front ends of the contours, extending along the circular arc-shaped locus, of left and right extension brackets of the first extension brackets respectively pass through positions of the right front fixing portion and the left front fixing portion to which the suspension arms are fixed.

2. The suspension frame structure according to claim 1, wherein the tangents of the left and right extension brackets intersect near the position of the central portion to which the engine mount is attached.

3. The suspension frame structure according to claim 1, wherein a straight line that connects the front ends of the contours, extending along the circular arc-shaped locus, of the left and right extension brackets passes through the positions of the right rear fixing portion and the left rear fixing portion to which the suspension arms are fixed, as viewed from an upper side of a vehicle.

4. The suspension frame structure according to claim 2, wherein a straight line that connects the front ends of the contours, extending along the circular arc-shaped locus, of the left and right extension brackets passes through the positions of the right rear fixing portion and the left rear fixing portion to which the suspension arms are fixed, as viewed from an upper side of the vehicle.

5. The suspension frame structure according to claim 1, wherein the suspension frame further includes:
an upper surface to which the engine mount is attached;
a vertical surface that extends downward from an edge of the upper surface on a vehicle rear side; and
a lower surface that extends toward a vehicle front side from a lower edge of the vertical surface,
wherein the first extension brackets each include:
a lower wall that is continuous with the lower surface and extends toward the vehicle rear side;
an outer vertical wall that extends upward from a side edge of the lower wall on an outer side in the vehicle width direction; and
an inner vertical wall that extends upward from a side edge of the lower wall on an inner side in the vehicle width direction, and
wherein an upper edge of the inner vertical wall is continuous with the edge of the upper surface on the vehicle rear side.

6. The suspension frame structure according to claim 2, wherein the suspension frame further includes:
an upper surface to which the engine mount is attached;
a vertical surface that extends downward from an edge of the upper surface on a vehicle rear side; and
a lower surface that extends toward a vehicle front side from a lower edge of the vertical surface,
wherein the first extension brackets each include:
a lower wall that is continuous with the lower surface and extends toward the vehicle rear side;
an outer vertical wall that extends upward from a side edge of the lower wall on an outer side in the vehicle width direction; and
an inner vertical wall that extends upward from a side edge of the lower wall on an inner side in the vehicle width direction, and
wherein an upper edge of the inner vertical wall is continuous with the edge of the upper surface on the vehicle rear side.

7. The suspension frame structure according to claim 3, wherein the suspension frame further includes:
an upper surface to which the engine mount is attached;
a vertical surface that extends downward from an edge of the upper surface on a vehicle rear side; and
lower surface that extends toward a vehicle front side from a lower edge of the vertical surface,
wherein the first extension brackets each include:
a lower wall that is continuous with the lower surface and extends toward the vehicle rear side;
an outer vertical wall that extends upward from a side edge of the lower wall on an outer side in the vehicle width direction; and
an inner vertical wall that extends upward from a side edge of the lower wall on an inner side in the vehicle width direction, and
wherein an upper edge of the inner vertical wall is continuous with the edge of the upper surface on the vehicle rear side.

8. The suspension frame structure according to claim 4, wherein the suspension frame further includes:
an upper surface to which the engine mount is attached;
a vertical surface that extends downward from an edge of the upper surface on a vehicle rear side; and
a lower surface that extends toward a vehicle front side from a lower edge of the vertical surface,
wherein the first extension brackets each include:
a lower wall that is continuous with the lower surface and extends toward the vehicle rear side;
an outer vertical wall that extends upward from a side edge of the lower wall on an outer side in the vehicle width direction; and
an inner vertical wall that extends upward from a side edge of the lower wall on an inner side in the vehicle width direction, and
wherein an upper edge of the inner vertical wall is continuous with the edge of the upper surface on the vehicle rear side.

9. The suspension frame structure according to claim 5, wherein the outer vertical wall extends toward a vehicle front side until the outer vertical wall overlaps a space surrounded by the upper surface, the vertical surface and the lower surface of the suspension frame as viewed from a side of a vehicle.

10. The suspension frame structure according to claim 6, wherein the outer vertical wall extends toward a vehicle front side until the outer vertical wall overlaps a space surrounded by the upper surface, the vertical surface and the lower surface of the suspension frame as viewed from a side of a vehicle.

11. The suspension frame structure according to claim 7, wherein the outer vertical wall extends toward a vehicle front side until the outer vertical wall overlaps a space surrounded by the upper surface, the vertical surface and the lower surface of the suspension frame as viewed from a side of a vehicle.

12. The suspension frame structure according to claim 8, wherein the outer vertical wall extends toward a vehicle front side until the outer vertical wall overlaps a space surrounded by the upper surface, the vertical surface and the lower surface of the suspension frame as viewed from a side of a vehicle.

* * * * *